United States Patent

Okubo et al.

(10) Patent No.: US 7,129,700 B2
(45) Date of Patent: Oct. 31, 2006

(54) ANGLE SENSOR

(75) Inventors: Takeo Okubo, Takefu (JP); Hiroyuki Kishishita, Fukui-ken (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 102 days.

(21) Appl. No.: 10/746,514

(22) Filed: Dec. 26, 2003

(65) Prior Publication Data

US 2004/0140796 A1    Jul. 22, 2004

(30) Foreign Application Priority Data

Jan. 22, 2003   (JP)   ............. 2003-013973
Nov. 13, 2003   (JP)   ............. 2003-383809

(51) Int. Cl.
*G01B 7/30* (2006.01)

(52) U.S. Cl. ................................. 324/207.25

(58) Field of Classification Search .......... 324/207.2, 324/207.21–207.26; 702/151; 33/1 PT, 33/1 N; 73/862.31, 862.332
See application file for complete search history.

(56) References Cited

U.S. PATENT DOCUMENTS

| | | | | |
|---|---|---|---|---|
| 4,810,965 A | * | 3/1989 | Fujiwara et al. | 324/207.22 |
| 6,373,241 B1 | * | 4/2002 | Weber et al. | 324/207.2 |
| 6,448,763 B1 | * | 9/2002 | Spellman | 324/207.21 |
| 6,515,474 B1 | * | 2/2003 | Dielschneider et al. | 324/207.24 |
| 6,518,749 B1 | * | 2/2003 | Oudet et al. | 324/207.2 |
| 6,586,929 B1 | * | 7/2003 | Luetzow | 324/207.24 |
| 2002/0121894 A1 | * | 9/2002 | Ooki et al. | 324/207.2 |
| 2003/0137292 A1 | * | 7/2003 | Welsch et al. | 324/207.2 |
| 2003/0137293 A1 | * | 7/2003 | Welsch et al. | 324/207.2 |
| 2004/0050180 A1 | * | 3/2004 | Abe et al. | 73/862.331 |

FOREIGN PATENT DOCUMENTS

JP    2000-121309    4/2000
KR    2002-0000765   1/2002

OTHER PUBLICATIONS

Official Communication dated Oct. 20, 2005, issued in the corresponding Korean Patent Application No. 10-2004-0003270. (with English translation).

First Chinese Office Action, along with English Translation issued in Chinese Application No. 200410002208.3 issued on Jun. 10, 2005.

* cited by examiner

*Primary Examiner*—Edward Lefkowitz
*Assistant Examiner*—Kenneth J. Whittington
(74) *Attorney, Agent, or Firm*—Keating & Bennett, LLP (57) ABSTRACT

An angle sensor includes a magnet fixed to a rotational shaft and a Hall device disposed at neutral detection position C such that it faces the magnet, thereby detecting the rotational angle of the magnet based on an output of the Hall device. A magnetic member is attached to each of the magnetic poles of the magnet so that the maximum magnetic flux portions are away from the neutral detection position C in the circumferential direction of the shaft, thereby allowing the magnetic flux distribution to be biased to the direction opposite from the Hall device.

18 Claims, 15 Drawing Sheets

ANGLE SENSOR

BACKGROUND OF THE INVENTION

1. Field of the Invention

The present invention relates to angle sensors, and more particularly to an angle sensor in which a magnet and a magnetic detector are disposed such that they face each other so as to detect the rotational angle of the magnet relative to the magnetic detector based on an output of the magnetic detector.

2. Description of the Related Art

Figure 10:
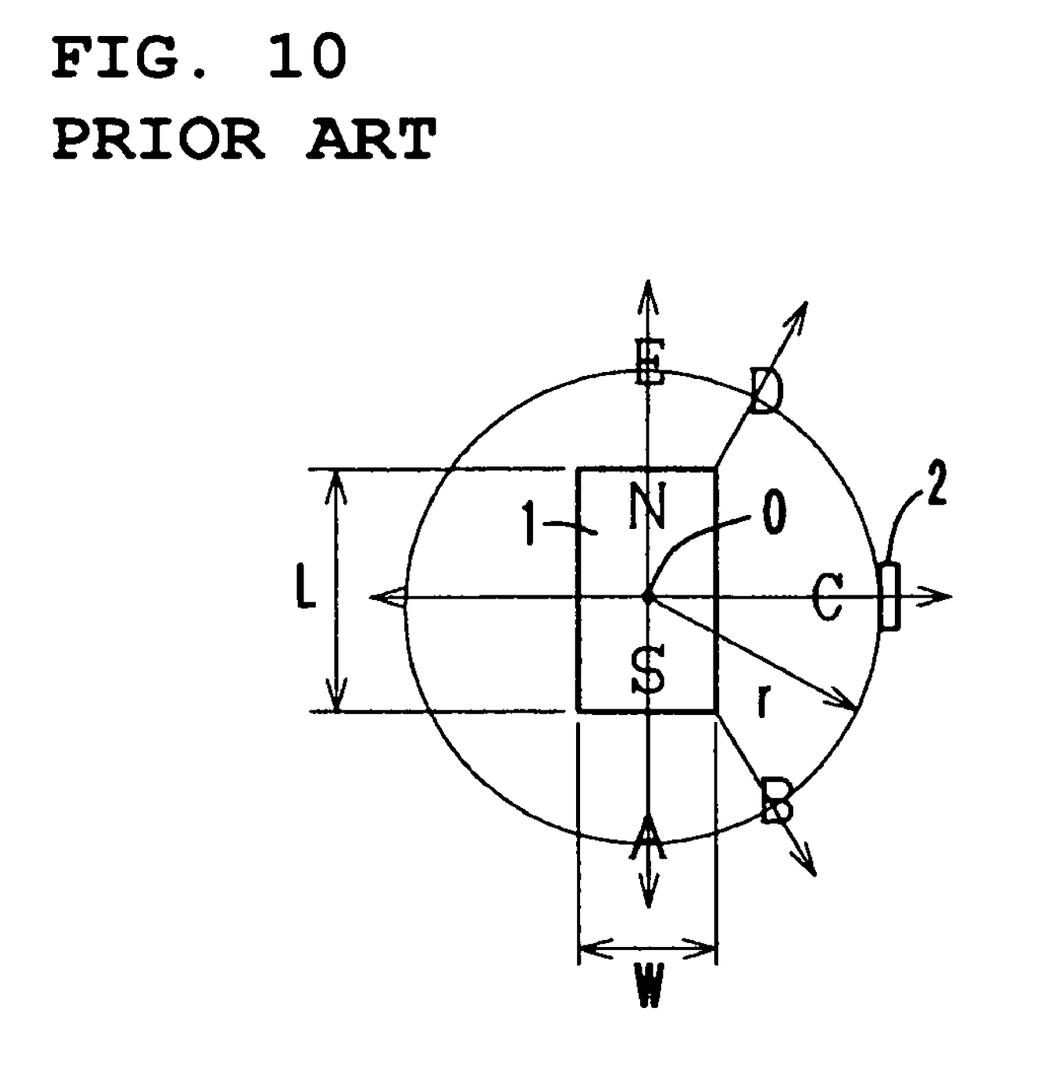
FIG. 10 illustrates the positional relationship between a magnet and a magnetic detector used in a known angle sensor.

In a typical known angle sensor, as shown in FIG. 10, a magnetic detector 2 is disposed such that it faces a rectangular magnet 1 which is attached to a rotational shaft (not shown) by allowing center O to coincide with the core of the shaft, and the rotational angle of the magnet 1 is detected based on an output of the stationary magnetic detector 2.

A magnetic detector is a Hall device or a magnetic resistor, which generates an output voltage or changes its resistance, respectively, in proportion to the magnitude of the magnetic flux density vertically passing through the device. In the case of the Hall device, for example, when the circumferential position of the Hall device relative to the magnet 1 changes from A, B, C, D, and E, the output voltage is changed, as shown in the diagram of FIG. 11.

In this type of angle sensor, in order to improve the detection precision, it is preferable that the relationship between the angle and the output is linear over the entire range of the angles to be detected. It is also preferable that the detectable angle range is wider. Accordingly, it is necessary that the output linearity of the magnetic detector be improved and the electrical effective angle range be increased.

Details of the output linearity and the electrical effective angle range of the magnetic detector are provided below. When the magnetic detector 2 is located at position A relative to the magnet 1, it is positioned in proximity to the S pole of the magnet 1. When the magnetic flux from the N pole is positive, the negative magnetic flux density becomes maximum in the magnetic detector 2, and the output voltage becomes minimum. Conversely, when the magnetic detector 2 is located at position E, it is positioned in proximity to the N pole, and accordingly, the output voltage becomes maximum. When the magnetic detector 2 is located at position C, the magnetic flux orthogonal to the magnetic detector 2 is zero, and thus, the output voltage becomes zero. In this specification, position C is referred to as the "neutral detection position", and when it is detected that the magnetic detector 2 is located at position C, this state is referred to as the "neutral detection state".

Figure 11:
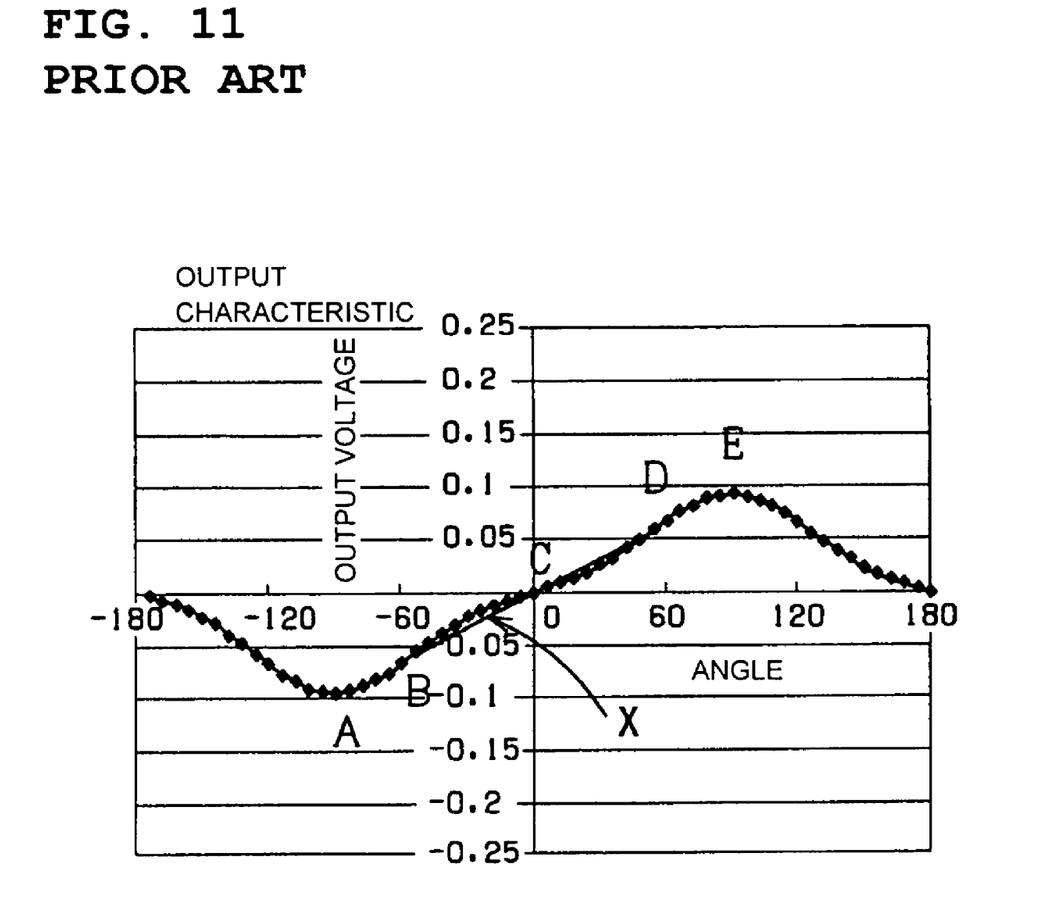
FIG. 11 is a graph illustrating the output characteristic of a known angle sensor.
Figure 12:
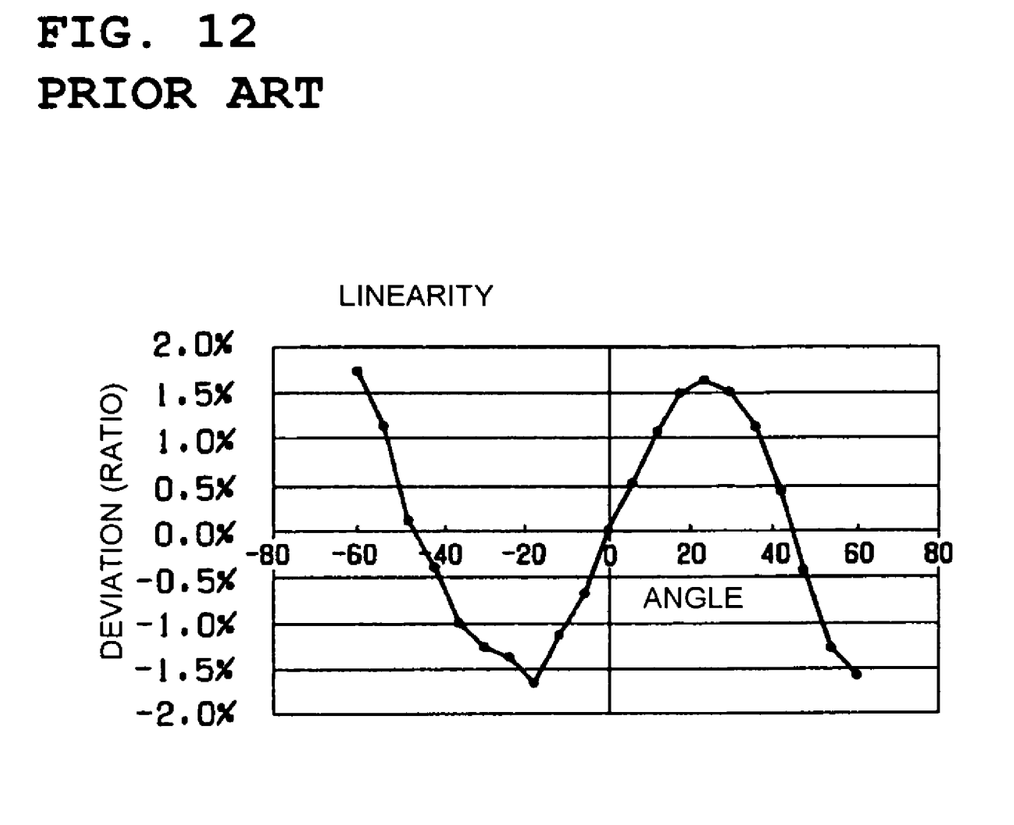
FIG. 12 is a graph illustrating a deviation of the output characteristic shown in FIG. 11 from the ideal output.

The ideal output characteristic is indicated by the straight line X shown in FIG. 11, and FIG. 12 shows a deviation of the output characteristic from the straight line X, which is indicated by the ratio to the maximum variable voltage (in this case, 0.15 V) of the detection range (in this case, ±60°). A smaller deviation is preferable in order to achieve the linear relationship of the output to the angle.

The electrical effective angle range includes the angles that can be detected while maintaining the output linearity. The effective angle range varies according to the purpose for the use of the sensor, and a wide range of angles is not always needed for all the purposes. However, although a sensor having a wide range of effective angles can be used in a narrow range of angles, a sensor having a narrow range of effective angles cannot be used in a wide range of angles. Accordingly, a sensor having a wider range of electrical effective angles is more practical. The electrical effective angle range of a known angle sensor exhibiting the characteristic shown in FIG. 11 is ±60°.

Figure 13:
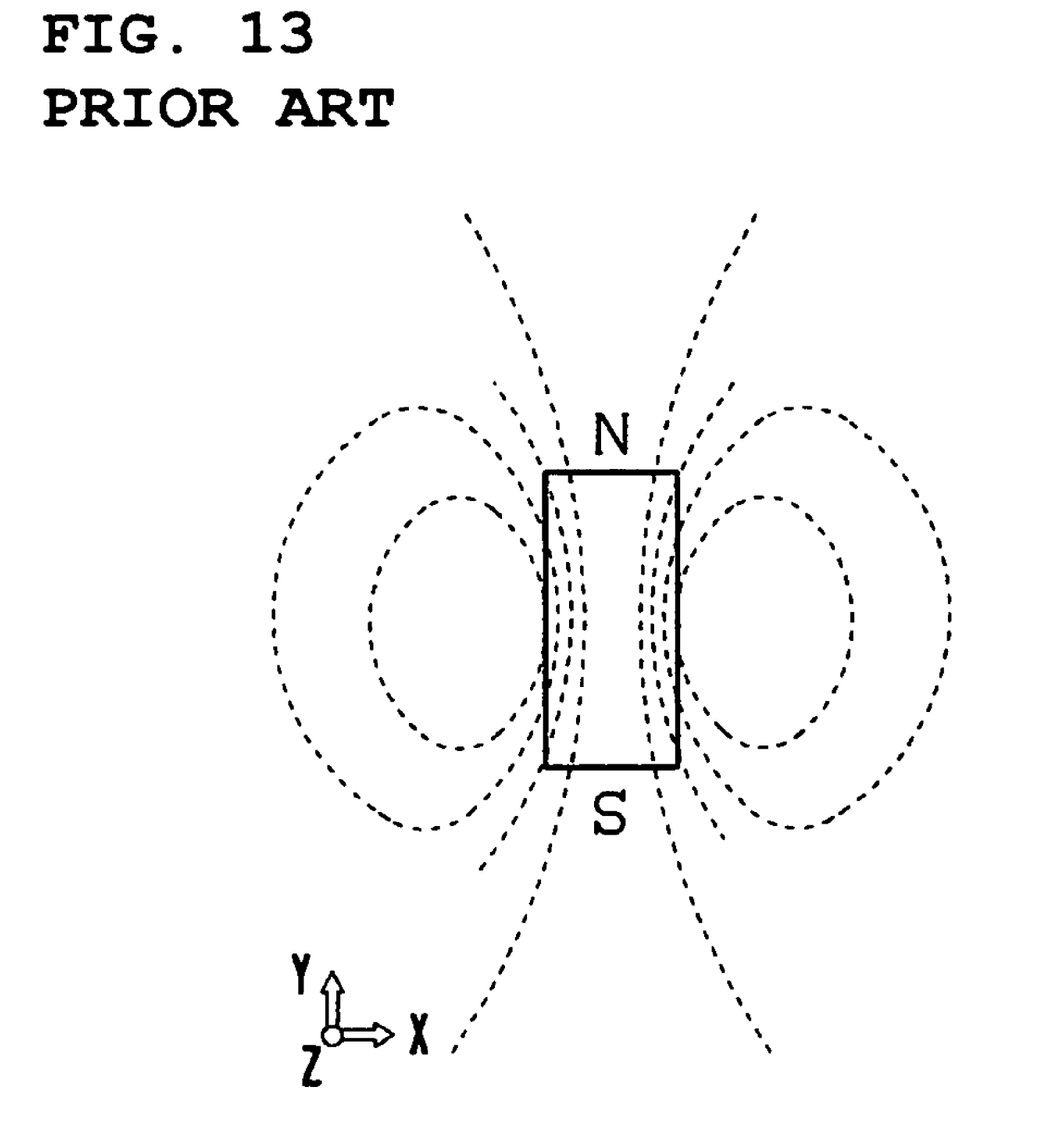
FIG. 13 illustrates a magnetic flux distribution formed by a rectangular-parallelepiped magnet.

Previously, the magnet is formed in the shape of a rectangular parallelepiped in view of high manufacturability, and the rectangular-parallelepiped magnet generates the magnetic flux shown in FIG. 13. When the magnet 1 is rotated around the center O, as shown in FIG. 10, the gradient of the output voltage between positions B and D is determined by length L. The output voltage of the maximum magnetic flux density of the S pole at position A and the output voltage of the maximum magnetic flux density of the N pole at position E are determined by the distance between the magnetic poles and the magnetic detector 2 (radius r), and the output level (magnetic flux density) is increased with a smaller distance therebetween.

However, the output characteristics at positions A and E (±90°) is slightly curved, and the effective angle range that can maintain the output linearity is at most about ±60°.

Figure 14A:
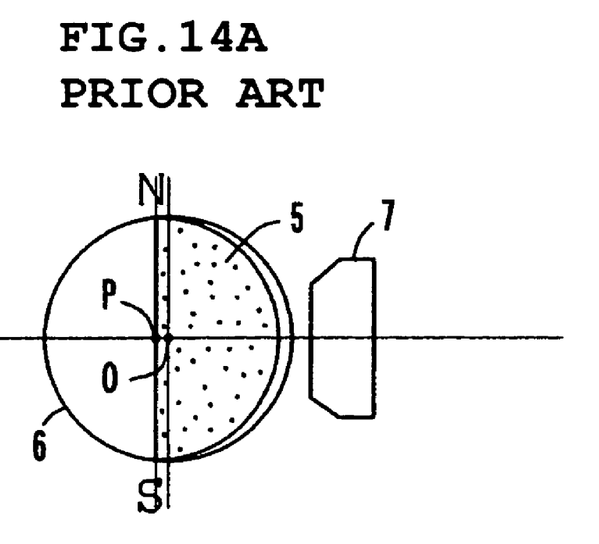
FIGS. 14A and 14B are a front view and a perspective view, respectively, illustrating the shape of an improved magnet in a known angle sensor.
Figure 14B:
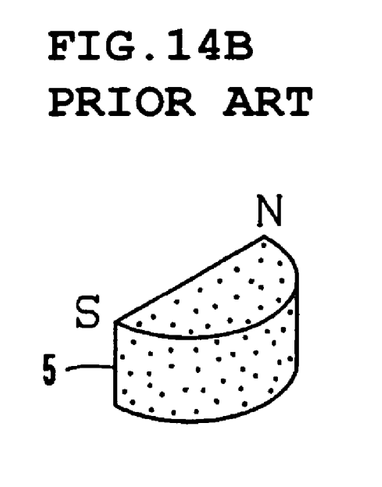

Japanese Unexamined Patent Application Publication No. 2000-121309 discloses the following angle sensor shown in FIGS. 14A and 14B that improves the output linearity of the magnetic detector. A semicircular magnet 5 is inserted into the side groove of a rotational shaft 6 such that center P becomes eccentric with respect to center O of the rotational shaft 6, and a Hall device 7 is fixed such that it faces the magnet 5.

Figure 15:
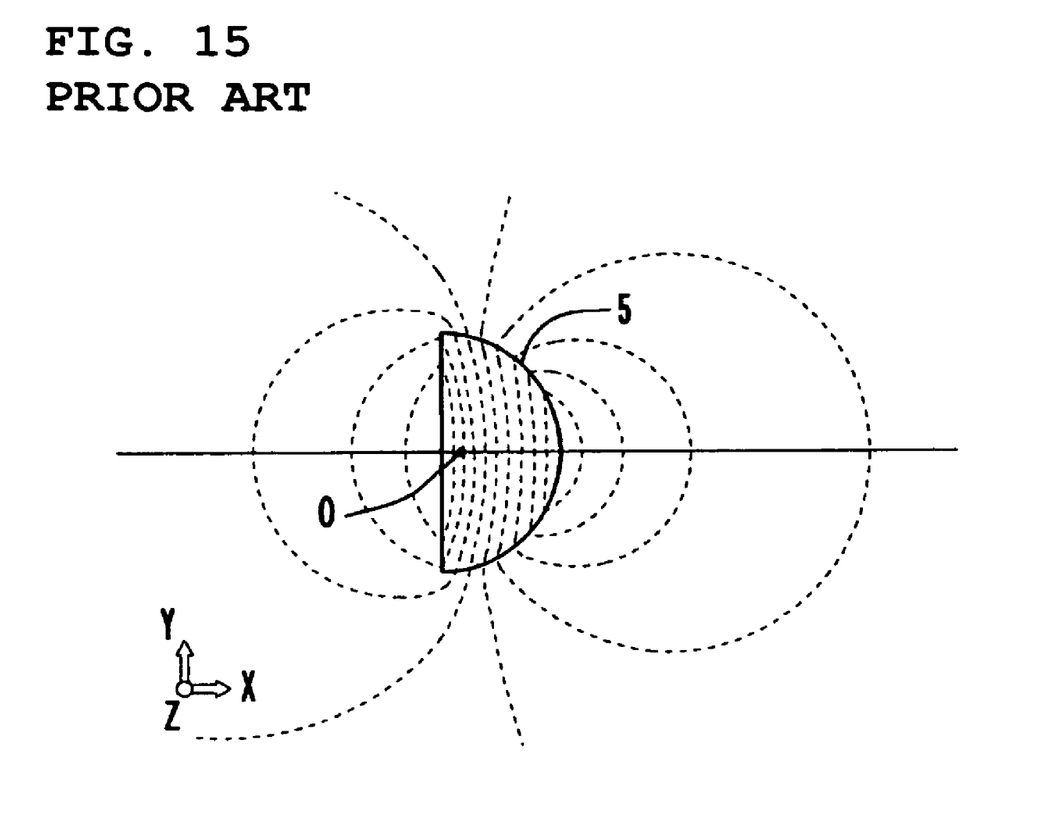
FIG. 15 illustrates a magnetic flux distribution formed by a semicircular magnet.

In the angle sensor disclosed in the above-described publication, the magnet 5 is formed to be semicircular so as to make the magnetic pole portions acute. Accordingly, the magnetic flux density is biased to the center O (see FIG. 15), thereby improving the linearity of the output characteristics within the effective angle range. However, the effective angle range is at most about ±60°, and cannot be increased further than that. Additionally, the manufacturing cost is increased because the magnet 5 has to be formed to be semicircular.

SUMMARY OF THE INVENTION

In order to overcome the problems described above, preferred embodiments of the present invention provide an angle sensor in which the output linearity can be improved by increasing the electrical effective angle range without increasing the cost of forming a magnet so as to significantly improve the detection precision.

According to a preferred embodiment of the present invention, an angle sensor includes a magnet and a magnetic detector arranged so as to face each other and so as to detect the relative rotational angle of the magnet and the magnetic detector based on an output of the magnetic detector. A magnetic member is attached to at least one of the N pole and the S pole of the magnet so that a maximum magnetic flux portion of the N pole and/or the S pole is farther away from the neutral detection position of the magnetic detector, and so that a straight line connecting the maximum magnetic flux portion of the N pole and the maximum magnetic flux portion of the S pole is farther away from the magnetic detector than a straight line connecting the center of the N pole and the center of the S pole of the magnet.

According to the angle sensor of this preferred embodiment of the present invention, by attaching a magnetic member to the magnet, the magnetic pole (maximum magnetic flux portion) can be set at a desired position, and accordingly, the maximum magnetic portion can be positioned away from the neutral detection position of the magnetic detector. Thus, the electrical effective angle range can be increased, and the linearity of the detected output is improved, thereby greatly improving the detection precision.

The maximum magnetic flux portion is the magnetic pole in which the magnetic flux concentrates, and substantially coincides with the center of the magnetic pole.

In the angle sensor of preferred embodiments of the present invention, the magnet may be disposed substantially at the center of a shaft having a generally circular cross section so that the maximum magnetic flux portion is away from the neutral detection position of the magnetic detector in the circumferential direction of the shaft.

The maximum magnetic flux portion may preferably be away from the neutral detection position by about 90° or greater. For example, if the end of the magnetic member is positioned at about 120° rotated from the neutral detection position of the magnetic detector, the electrical effective angle of about ±110° can be achieved.

In the angle sensor of preferred embodiments of the present invention, the magnet can be formed without requiring special processing, and thus, the manufacturing cost of the magnet is not increased. The magnet may preferably be a rectangular parallelepiped, in which case, it can be formed most inexpensively and is also easily magnetized. However, the magnet is not restricted to this shape, and may be a cylinder or polygonal column or other suitable shape.

The magnetic member may preferably be attached to each of the N pole and the S pole of the magnet in view of the characteristic stability. In this case, the magnetic members may preferably be attached to the magnet such that they are line-symmetrical to each other with respect to a straight line connecting the neutral detection position of the magnetic detector and the center of the magnet, thereby exhibiting a more stable characteristic.

The magnetic member may be configured in any shape, for example, an arc, triangle, or polygon, as long as the magnetic flux distribution that can achieve the advantages of the present invention is obtained. The magnetic member may be formed by pressing magnetic material powder or by bending a planar magnetic member, and the magnetic member may also be cut if necessary.

According to the angle sensor of preferred embodiments of the present invention, by attaching magnetic members to the magnet, the maximum magnetic portions formed by the magnet can be positioned away from the neutral detection position of the magnetic detector. Thus, the electrical effective angle range can be increased, and the linearity of the detected output within the effective angle range can be improved, thereby enhancing the detection precision. Additionally, special processing is not required for forming the magnet, and thus, the magnet can be formed inexpensively.

Other features, elements, characteristics and advantages of the present invention will become more apparent form the following detailed description of preferred embodiments with reference to the attached drawings.

DETAILED DESCRIPTION OF PREFERRED EMBODIMENTS

An angle sensor according to the present invention is described below with reference to the accompanying drawings through illustration of preferred embodiments thereof. Although specific numerical values of the dimensions of a magnet and those to indicate the positional relationship between the magnet and a magnetic detector are given, they are examples only and are not restrictive of the present invention.

The basic configuration of the angle sensor of preferred embodiments of the present invention is first described below with reference to FIGS. 1 through 3.

Figure 1:
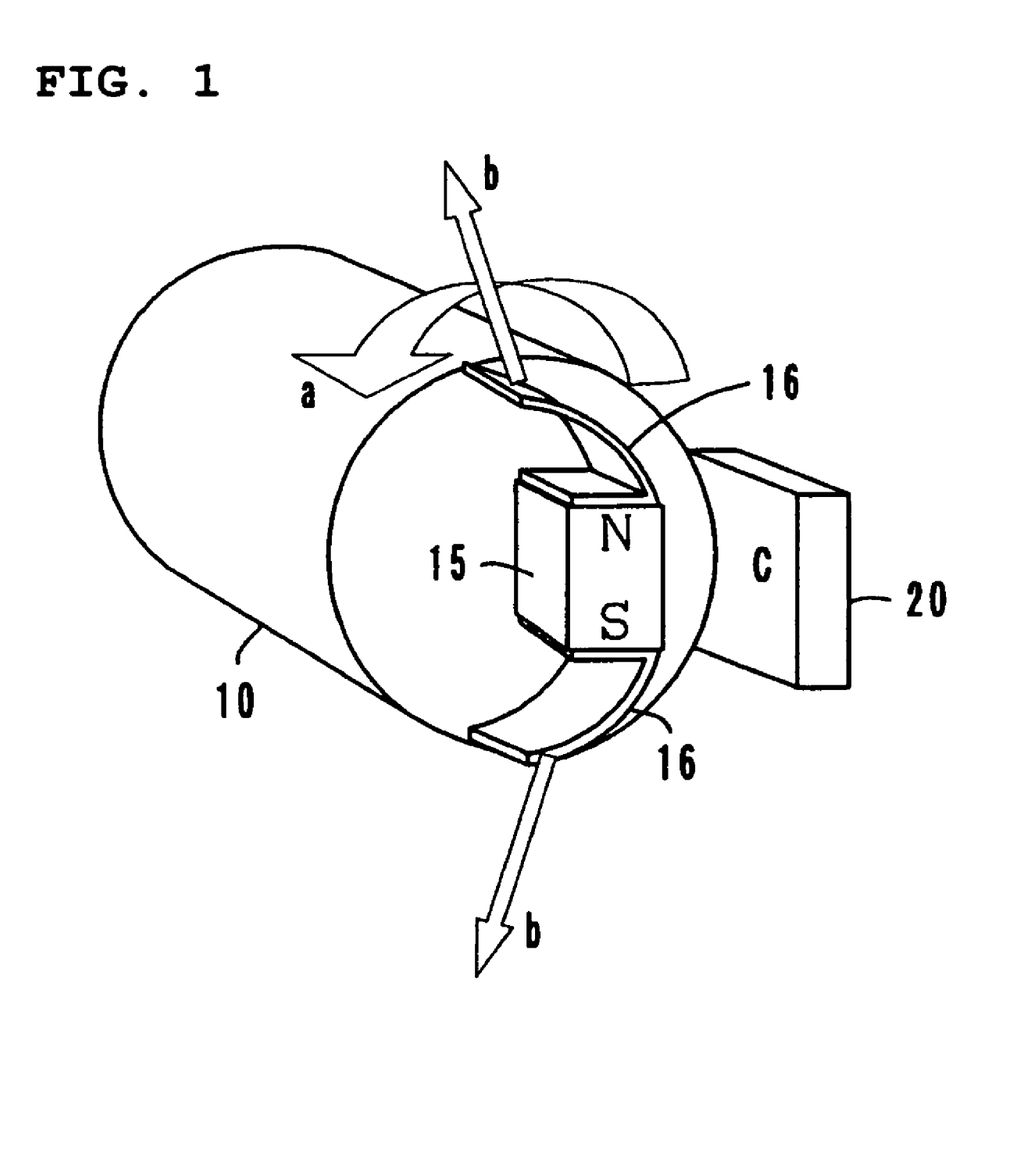
FIG. 1 is a perspective view illustrating the basic configuration of an angle sensor according to a preferred embodiment of the present invention.
Figure 2:
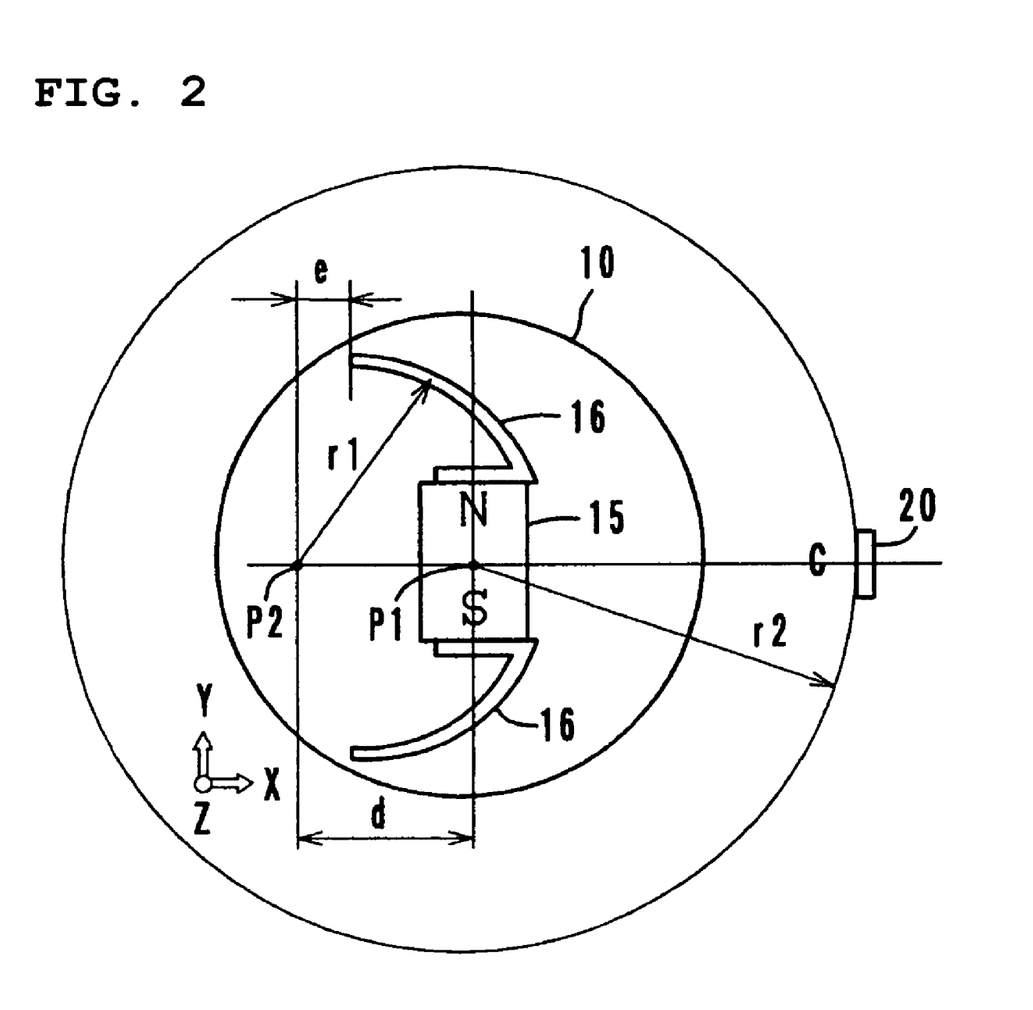
FIG. 2 is a front view illustrating the basic configuration of the angle sensor according to a preferred embodiment of the present invention.
Figure 3:
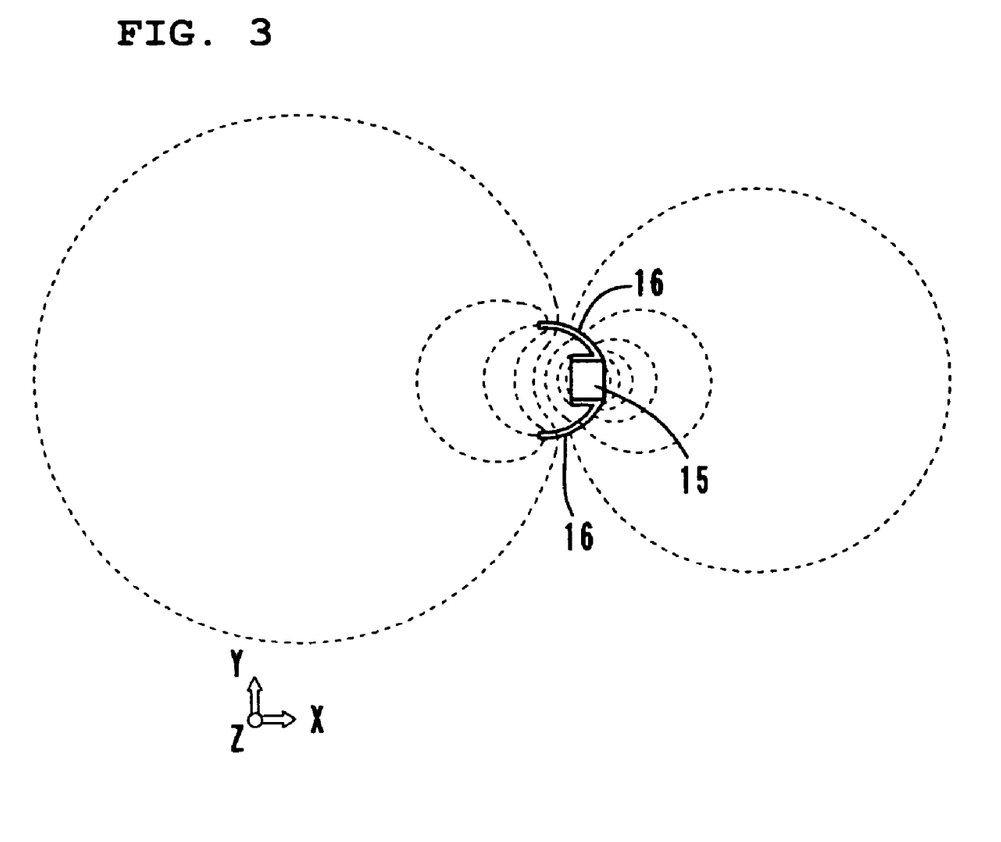
FIG. 3 illustrates the magnetic flux distribution formed by a magnet and magnetic members used in the angle sensor according to a preferred embodiment of the present invention.

In the angle sensor of preferred embodiments of the present invention, as shown in FIGS. 1 and 2, a substantially rectangular-parallelepiped magnet 15 is fixed to a shaft 10, which is rotatable in the direction indicated by arrow a and in the opposite direction, and a Hall device 20, which functions as a magnetic detector, is fixed at the neutral detection position C such that it faces the magnet 15. Magnetic members 16 are attached to the N pole and the S pole at the ends of the magnet 15. The rotational center of the shaft 10 and the center of the magnet 15 coincide with each other, as indicated by P1 in FIG. 2.

The magnetic members 16 are preferably formed in the shape of arcs, which extend away from the neutral detection position C around P2 as the center in the neutral detection state. Since the magnetic members 16 extend away from the magnetic poles of the magnet 15, the magnetic flux density formed by the magnet 15 and the magnetic members 16 is biased to the direction opposite to the Hall device 20, as shown in FIG. 3. That is, the portions exhibiting the maximum magnetic flux are the ends of the magnetic members 16, and they are spaced away from the neutral detection position C of the Hall device 20 in the circumferential direction of the shaft 10. The directions of the maximum magnetic flux density are indicated by arrows b in FIG. 1.

The magnet 15, which is preferably formed by slicing it from a magnet ingot, in the shape of a substantially rectangular parallelepiped, can be manufactured at low cost and is also easily magnetized. The magnet 15 has a length in the magnetization direction (vertical direction in FIG. 2) of, for example, about 3 mm, a width (horizontal direction in FIG. 2) of, for example, about 2 mm, and a thickness (depth direction in FIG. 2) of, for example, about 2 mm to about 4 mm. Since the magnetic members 16 are attached to the poles of the magnet 15 in preferred embodiments of the present invention, it is sufficient to provide a width of the magnet 15 with such a degree as to ensure the minimum level of strength and demagnetization as a magnet.

Although the center of the magnet 15 coincides with the rotational center P1 of the shaft 10, it may be eccentric with respect to the rotational center P1. In preferred embodiments of the present invention, the output characteristic of the Hall device 20 is influenced by the distribution of the magnetic lines of force formed by, not the magnet 15 solely, but the magnet 15 and the magnetic members 16, and thus, the center position of the magnet 15 is not so important.

The magnetic members 16 are preferably formed by bending a planar magnetic material, for example, iron, having a thickness of about 0.3 mm, and include the portions in contact with the magnetic poles of the magnet 15 and the arc-like portions. The width of the magnetic members 16, which is preferably substantially the same as the thickness of the magnet 15, is sufficiently larger than the size (about 0.2 mm square) of a semiconductor chip integrated into the Hall device 20.

As shown in FIG. 2, the arc-like portions of the magnetic members 16 are each formed by part of a circle having radius r1 of, for example, about 4 mm from the center P2. The center P2 is eccentric from the rotational center P1 by distance d of, for example, about 2.46 mm in the −X direction. The ends of the arc-like portions are positioned at about ±120° from the rotational center P1 and are away from the center P2 by distance e of, for example, about 0.5 mm in the X direction.

The Hall device 20 is disposed vertically while facing the center of the magnet 15 at the neutral detection position C by being away from the rotational angle P1 by radius r2 of, for example, about 7 mm.

Figure 4A:
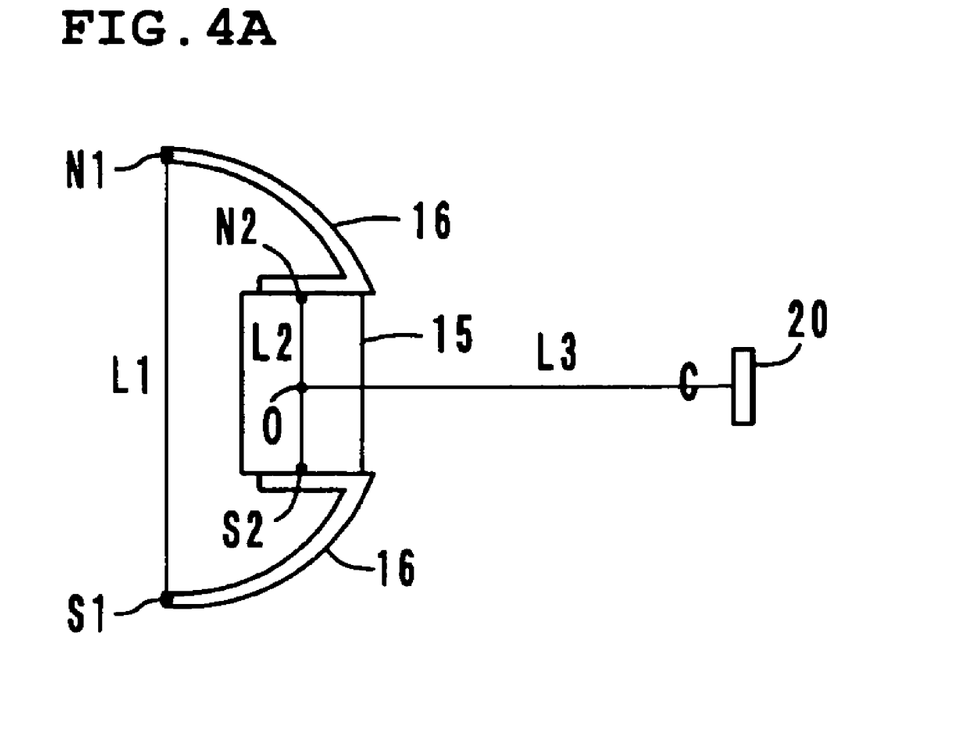
FIGS. 4A and 4B illustrate the positions of the magnetic members in the angle sensor according to a preferred embodiment of the present invention.

In this preferred embodiment, as shown in FIG. 4A, in the neutral detection state, straight line L1 connecting the N-pole maximum magnetic flux N1 and the S-pole maximum magnetic flux S1 is farther away from the Hall device 20 than straight line L2 connecting center N2 of the N pole and center S2 of the S pole of the magnet 15. The magnetic members 16 are attached to the magnet 15 so that they are line-symmetrical to each other with respect to straight line L3 connecting the neutral detection position C of the Hall device 20 and the center O of the magnet 15.

Figure 4B:
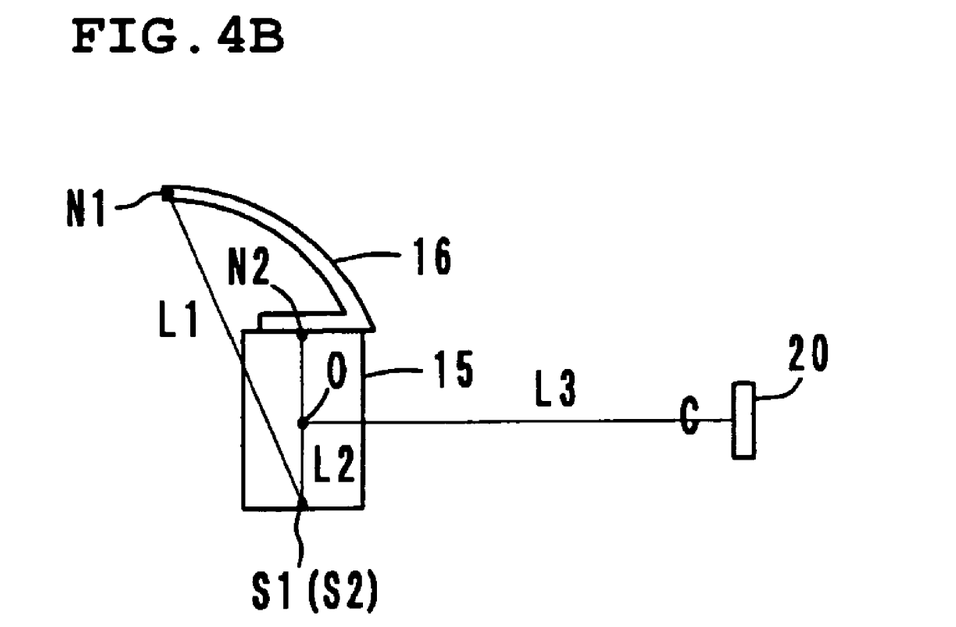

The magnetic member 16 may be fixed to only one magnetic pole of the magnet 15. FIG. 4B illustrates an example in which one magnetic member 16 is fixed to the N pole of the magnet 15. In this case, the S-pole maximum magnetic flux S1 coincides with the center S2 of the S pole of the magnet 15, and the straight line L1 connecting the N-pole maximum magnetic flux N1 and the S-pole maximum magnetic flux S1 is farther away from the Hall device 20 than the straight line L2 connecting the center N2 of the N pole and the center S2 of the S pole of the magnet 15.

Figure 5:
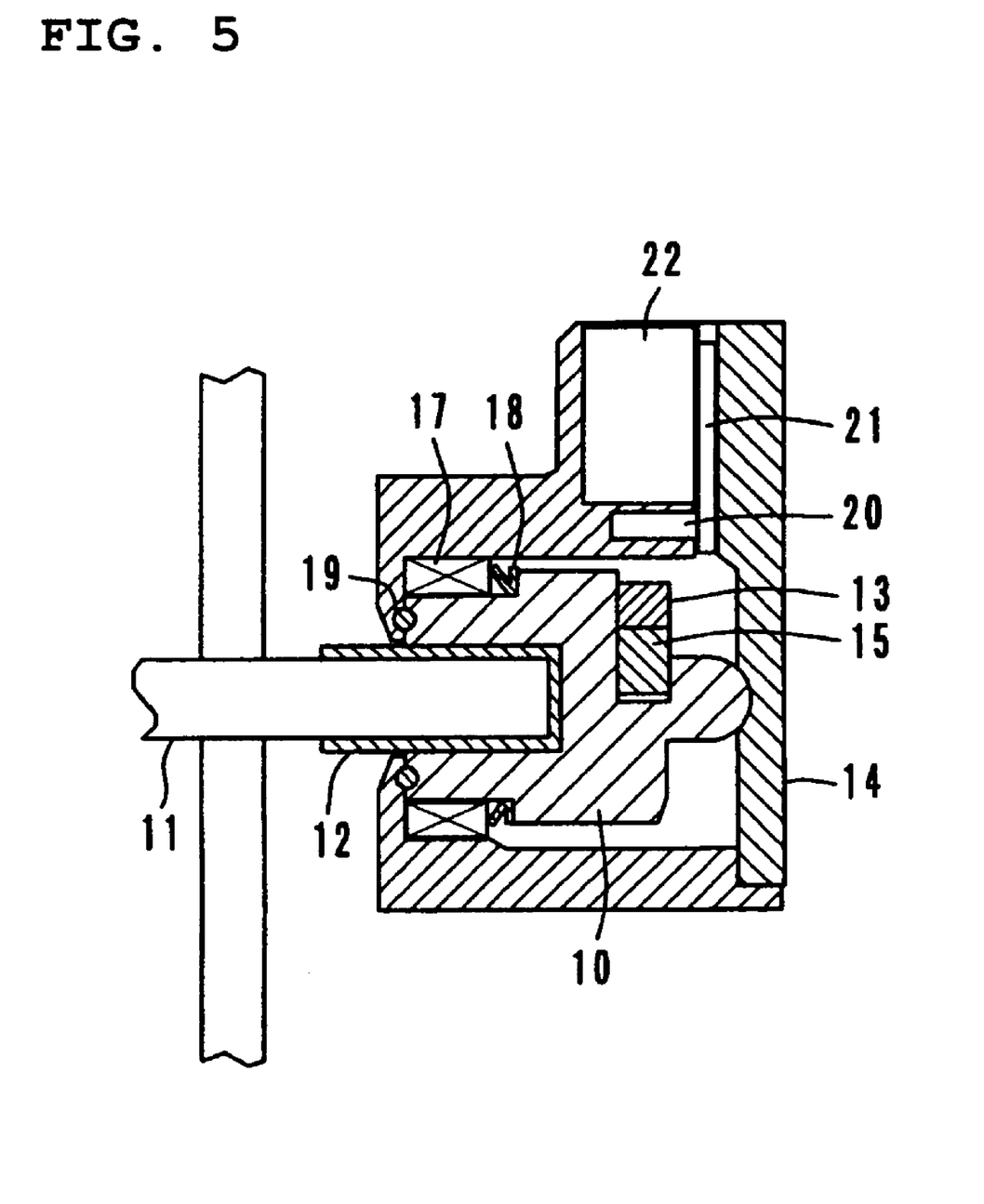
FIG. 5 is a sectional view illustrating an angle sensor according to a preferred embodiment of the present invention.
Figure 6:
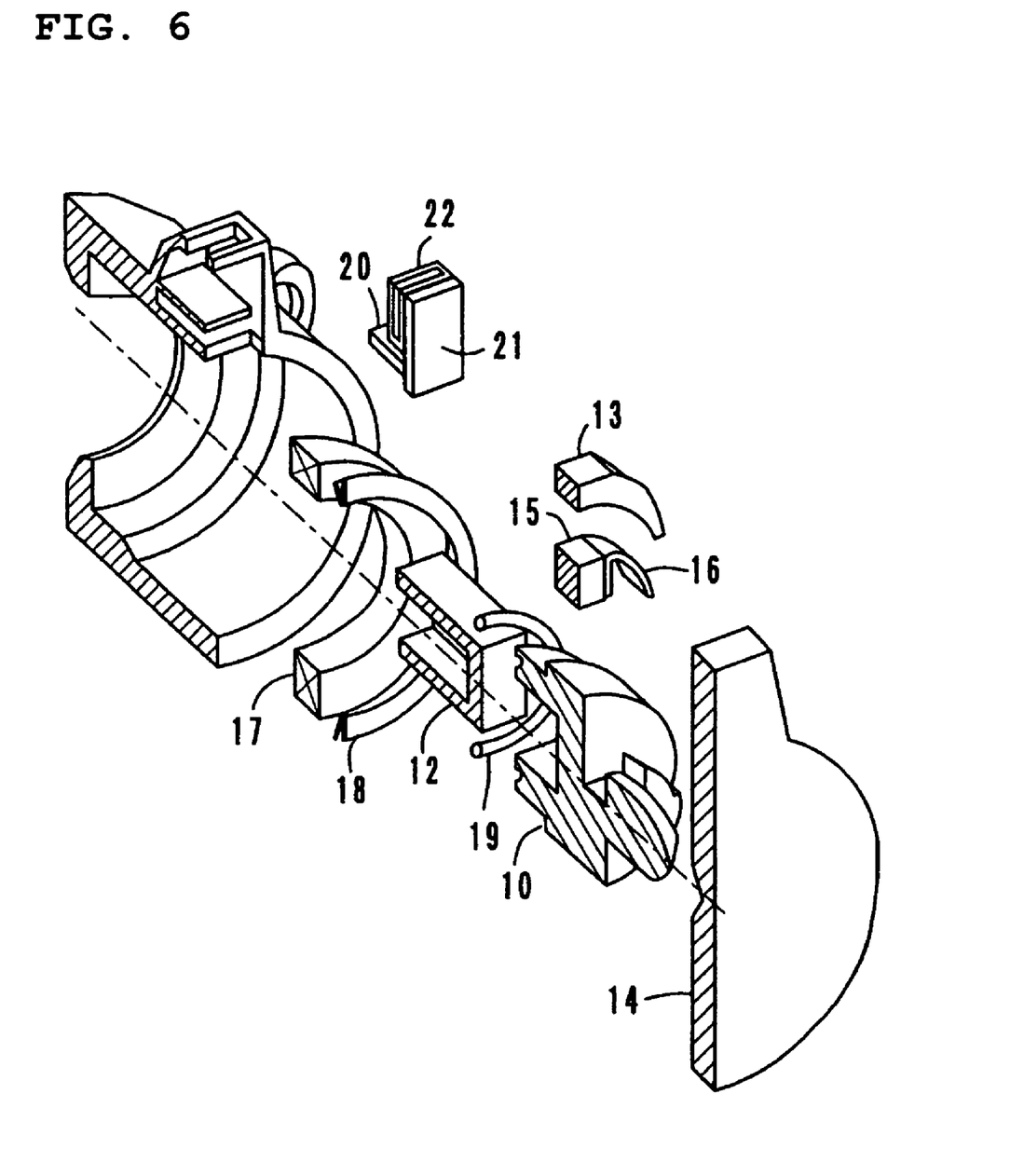
FIG. 6 is an exploded perspective view illustrating the angle sensor shown in FIG. 5.

A description is now given, with reference to FIGS. 5 and 6, of a specific configuration of the angle sensor through illustration of a preferred embodiment of the present invention.

The magnet 15 is attached to the shaft 10 which is fixed to the end of a shaft 11 with an attachment 12, and is held, together with the magnetic members 16, by a holder 13. The angle sensor further includes a cover 14, a bearing 17, a spring 18, and an O ring 19. The Hall device 20 is fixed to a substrate 21 provided with a socket 22.

Figure 7:
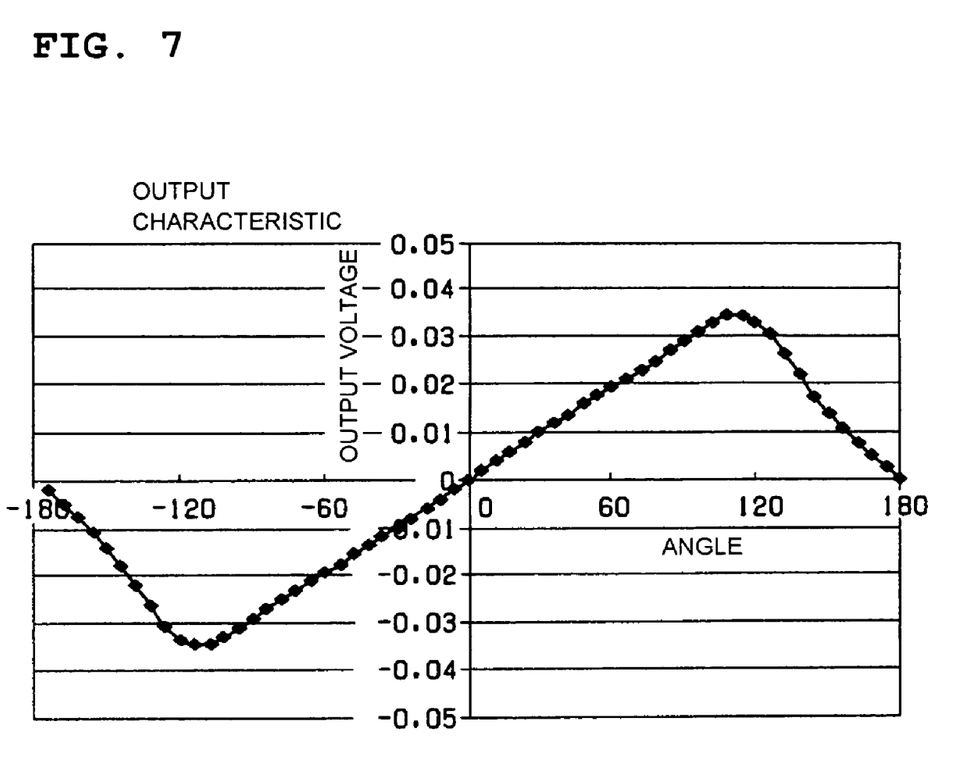
FIG. 7 is a graph illustrating the output characteristic of the angle sensor shown in FIG. 5.

In the angle sensor constructed in accordance with this preferred embodiment, the output characteristic of the Hall device 20 with respect to the rotational angle of the magnet 15 (including the shafts 10 and 11) is shown in FIG. 7. FIG. 7 reveals that the output characteristic exhibiting a high level of linearity can be obtained in a wide angle range of ±110° from the neutral detection position C (zero output). That is, the electrical effective angle range is considerably increased.

Figure 8:
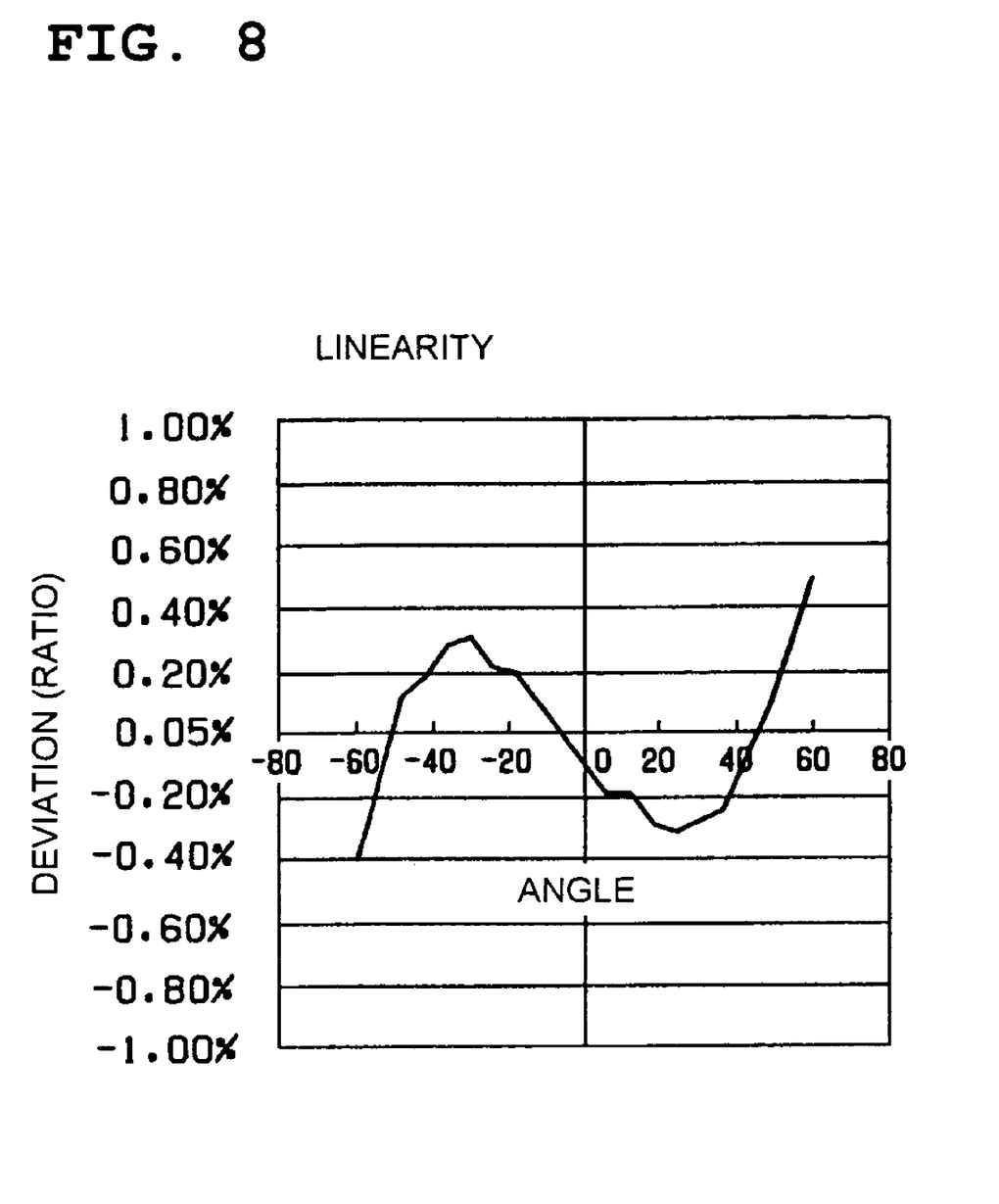
FIG. 8 is a graph illustrating a deviation of the output characteristic shown in FIG. 7 from the ideal output.

As shown in FIG. 12, a deviation from the ideal output characteristic (indicated by the ratio to the maximum variable voltage) is shown in FIG. 8. By comparing FIG. 8 with FIG. 12, it can be seen that the deviation can be considerably decreased in this preferred embodiment so as to improve the detection precision.

In this preferred embodiment, the magnet 15 is preferably formed in the shape of a small rectangular parallelepiped, and can be manufactured at low cost and is also easily magnetized.

The magnet 15 and the magnetic members 16 may be configured in any shape and may be manufactured in any manner. For example, the magnet 15 does not have to be a rectangular parallelepiped, and may be a cylinder or polygonal column or other suitable shape, and the magnetic members 16 do not have to be arc, and may be triangular or polygonal or other suitable shape. Instead of bending a planar magnetic member, the magnetic members 16 may be formed by pressing magnetic material powder, or may also be cut if necessary.

Figure 9A:
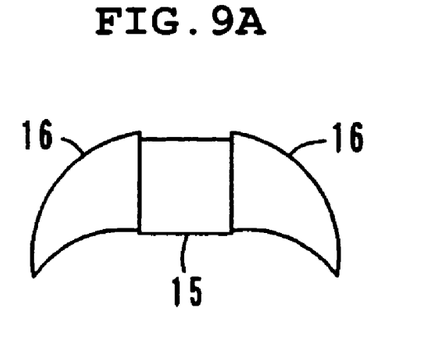
FIGS. 9A through 9F are front views of various modifications of the magnet and the magnetic members.
Figure 9B:
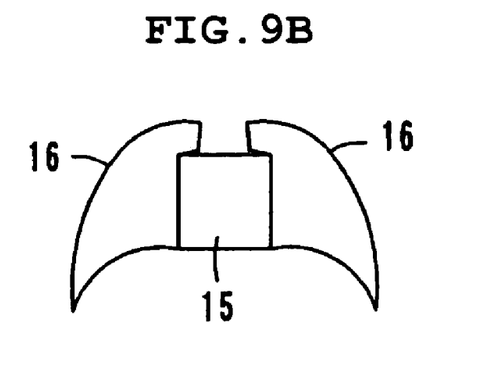
Figure 9C:
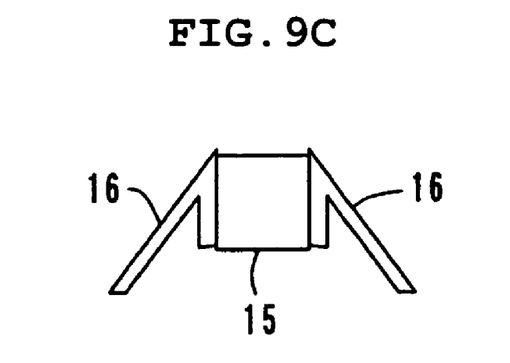
Figure 9D:
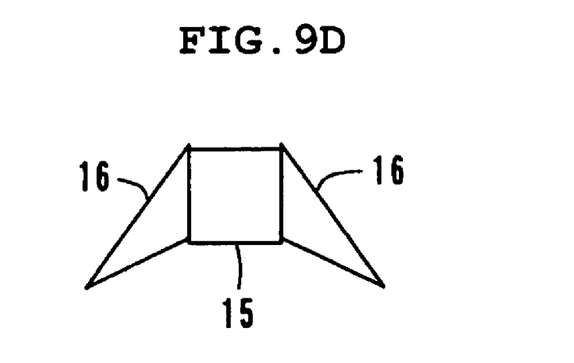
Figure 9E:
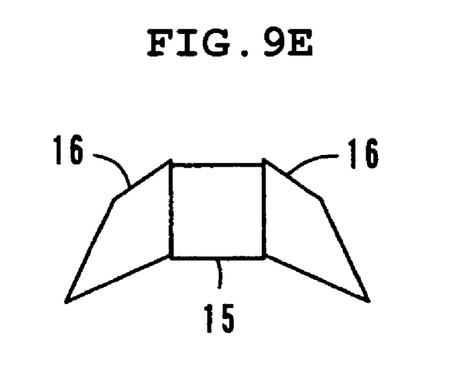
Figure 9F:
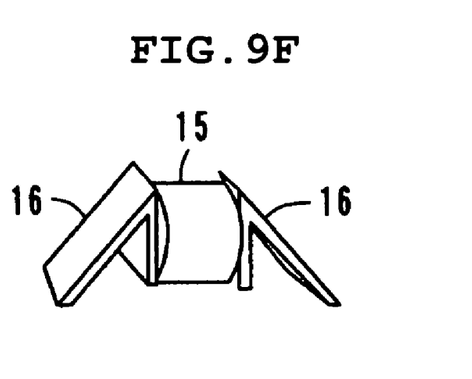

In FIGS. 9A and 9B, examples in which generally arc-like magnetic members 16 are attached to the magnet 15 are shown. In FIGS. 9C and 9D, examples in which generally triangular magnetic members 16 are attached to the magnet 15 are shown. In FIG. 9E, an example in which polygonal magnetic members 16 are attached to the magnet 15 is shown. By varying the configuration of the magnetic members 16, for example, to triangles or polygons as in the above examples, the output characteristic of the Hall device 20 can be set in a desired manner. In FIG. 9F, an example in which generally triangular magnetic members 16 are attached to a cylinder magnet 15 is shown.

The angle sensor of the present invention is not restricted to the above-described preferred embodiments, and may be changed or modified without departing from the spirit of the invention.

For example, as the magnetic detector, a magnetic resistor may be used instead of the above-described Hall device. The structure in which the magnet and the magnetic members are attached to the rotational shaft or the positional relationship of the magnet and the magnetic members to the magnetic detector may be set in a desired manner. In particular, although in the above-described preferred embodiments, the initial position of the Hall device 20 is set at the neutral detection position C, it may be set at any position according to design purposes.

The present invention is not limited to each of the above-described preferred embodiments, and various modifications are possible within the range described in the claims. An embodiment obtained by appropriately combining technical features disclosed in each of the different preferred embodiments is included in the technical scope of the present invention.

What is claimed is:

1. An angle sensor comprising:
   a magnet; and
   a magnetic detector arranged such that it faces the magnet so as to detect a relative rotational angle of the magnet and the magnetic detector based on an output of the magnetic detector; wherein
   a magnetic member is attached to at least one of the N pole and the S pole of the magnet so that a maximum magnetic flux portion of said at least one of the N pole and the S pole is farther away from a neutral detection position of the magnetic detector, and such that a straight line connecting the maximum magnetic flux portion of the N pole and the maximum magnetic flux portion of the S pole is farther away from the magnetic detector than a straight line connecting the center of the N pole and the center of the S pole of the magnet; and
   the magnet is disposed substantially at the center of a shaft having a generally circular cross section so that the maximum magnetic flux portion is spaced away from the neutral detection position of the magnetic detector in the circumferential direction of the shaft.

2. An angle sensor according to claim 1, wherein the magnet has a polygonal column shape.

3. An angle sensor according to claim 1, wherein an end of the magnetic member is positioned at about 120° rotated from the neutral detection position of the magnetic detector.

4. An angle sensor according to claim 1, wherein the magnetic member attached to at least one of the N pole and the S pole of the magnet includes a first magnetic member attached to the N pole of the magnet and a second magnetic member attached to the S pole of the magnet.

5. An angle sensor according to claim 4, wherein the first and second magnetic members are attached to the magnet such that the first and second magnetic members are line-symmetrical relative to each other with respect to a straight line connecting the neutral detection position of the magnetic detector and the center of the magnet.

6. An angle sensor according to claim 1, wherein the magnetic member is configured in the shape of an arc.

7. An angle sensor according to claim 1, wherein the magnetic member is configured in the shape of a triangle.

8. An angle sensor according to claim 1, wherein the magnetic member is configured in the shape of a polygon.

9. An angle sensor according to claim 1, wherein the magnetic member is made of pressed magnetic material powder.

10. An angle sensor according to claim 1, wherein the magnetic member is made of a bent planar magnetic member.

11. An angle sensor according to claim 1, wherein the magnet has a substantially rectangular parallelepiped shape.

12. An angle sensor according to claim 1, wherein the magnet has a substantially cylindrical shape.

13. An angle sensor comprising:
    a magnet; and
    a magnetic detector arranged such that it faces the magnet so as to detect a relative rotational angle of the magnet and the magnetic detector based on an output of the magnetic detector; wherein
    a magnetic member is attached to at least one of the N pole and the S pole of the magnet so that a maximum magnetic flux portion of said at least one of the N pole and the S pole is farther away from a neutral detection position of the magnetic detector, and such that a straight line connecting the maximum magnetic flux portion of the N pole and the maximum magnetic flux portion of the S pole is farther away from the magnetic detector than a straight line connecting the center of the N pole and the center of the S pole of the magnet; and
    an end of the magnetic member is positioned at about 120° rotated from the neutral detection position of the magnetic detector.

14. An angle sensor according to claim 13, wherein the magnetic member attached to at least one of the N pole and the S pole of the magnet includes a first magnetic member attached to the N pole of the magnet and a second magnetic member attached to the S pole of the magnet.

15. An angle sensor according to claim 14, wherein the first and second magnetic members are attached to the magnet such that the first and second magnetic members are line-symmetrical relative to each other with respect to a straight line connecting the neutral detection position of the magnetic detector and the center of the magnet.

16. An angle sensor comprising:
    a magnet; and
    a magnetic detector arranged such that it faces the magnet so as to detect a relative rotational angle of the magnet and the magnetic detector based on an output of the magnetic detector; wherein
    a magnetic member is attached to at least one of the N pole and the S pole of the magnet so that a maximum magnetic flux portion of said at least one of the N pole and the S pole is farther away from a neutral detection position of the magnetic detector, and such that a straight line connecting the maximum magnetic flux portion of the N pole and the maximum magnetic flux portion of the S pole is farther away from the magnetic detector than a straight line connecting the center of the N pole and the center of the S pole of the magnet; and
    the magnetic member is made of a bent planar magnetic member.

17. An angle sensor according to claim 16, wherein the magnetic member attached to at least one of the N pole and the S pole of the magnet includes a first magnetic member attached to the N pole of the magnet and a second magnetic member attached to the S pole of the magnet.

18. An angle sensor according to claim 17, wherein the first and second magnetic members are attached to the magnet such that the first and second magnetic members are line-symmetrical relative to each other with respect to a straight line connecting the neutral detection position of the magnetic detector and the center of the magnet.

* * * * *